United States Patent
Sip

(10) Patent No.: US 8,163,415 B2
(45) Date of Patent: Apr. 24, 2012

(54) ELECTRONIC DEVICE

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 393 days.

(21) Appl. No.: 12/541,117

(22) Filed: Aug. 13, 2009

(65) Prior Publication Data

US 2010/0209753 A1   Aug. 19, 2010

(30) Foreign Application Priority Data

Feb. 16, 2009   (CN) .......................... 2009 1 0300426

(51) Int. Cl.
*H01M 2/10*   (2006.01)
*H01M 2/30*   (2006.01)

(52) U.S. Cl. .............. 429/96; 429/97; 429/99; 429/123; 429/178

(58) Field of Classification Search ........................ None
See application file for complete search history.

(56) References Cited

U.S. PATENT DOCUMENTS 5,369,802 A * 11/1994 Murray .......................... 455/351
5,863,218 A * 1/1999 Quat et al. ..................... 439/500

\* cited by examiner

*Primary Examiner* — Jonathan Crepeau
(74) *Attorney, Agent, or Firm* — Altis Law Group, Inc.

(57) ABSTRACT

An electronic device includes two batteries and a main body. The main body defines a sliding groove passing through two parallel surfaces of the main body. The sliding groove includes an upper surface, a lower surface parallel to the upper surface, a positive contact plate and a negative contact plate. The positive contact plate is positioned on the upper surface. The negative contact plate is positioned on the lower surface. During replacement of the battery, each positive power supply plate of the two batteries remaining in contact with the positive contact plate, and each negative power supply plate of the two batteries remaining in contact with the negative contact plate.

9 Claims, 5 Drawing Sheets

ELECTRONIC DEVICE

BACKGROUND

1. Technical Field

The present disclosure relates to electronic devices and, particularly, to an electronic device which is powered by a replaceable battery.

2. Description of the Related Art

Some electronic devices, uses two rechargeable batteries for extending the use of the electronic devices for situations where a mains power source may not be available. When the present battery runs out of power, users need to shut down the electronic device, replace the dead battery with the spare battery, and then boot up the electronic device. This is an inconvenience because the user may have to interrupt whatever he was doing, on the electronic device, to replace the battery. In addition, it typically takes a long time to shut down and boot up the electronic device. This can be time-consuming.

Therefore, what is desired is an electronic device that can overcome the above described limitations.

BRIEF DESCRIPTION OF THE DRAWINGS

Many aspects of the present electronic device should be better understood with reference to the accompanying drawings. The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION

Embodiments of the present electronic device will be now described in detail with reference to the drawings.

Figure 1:
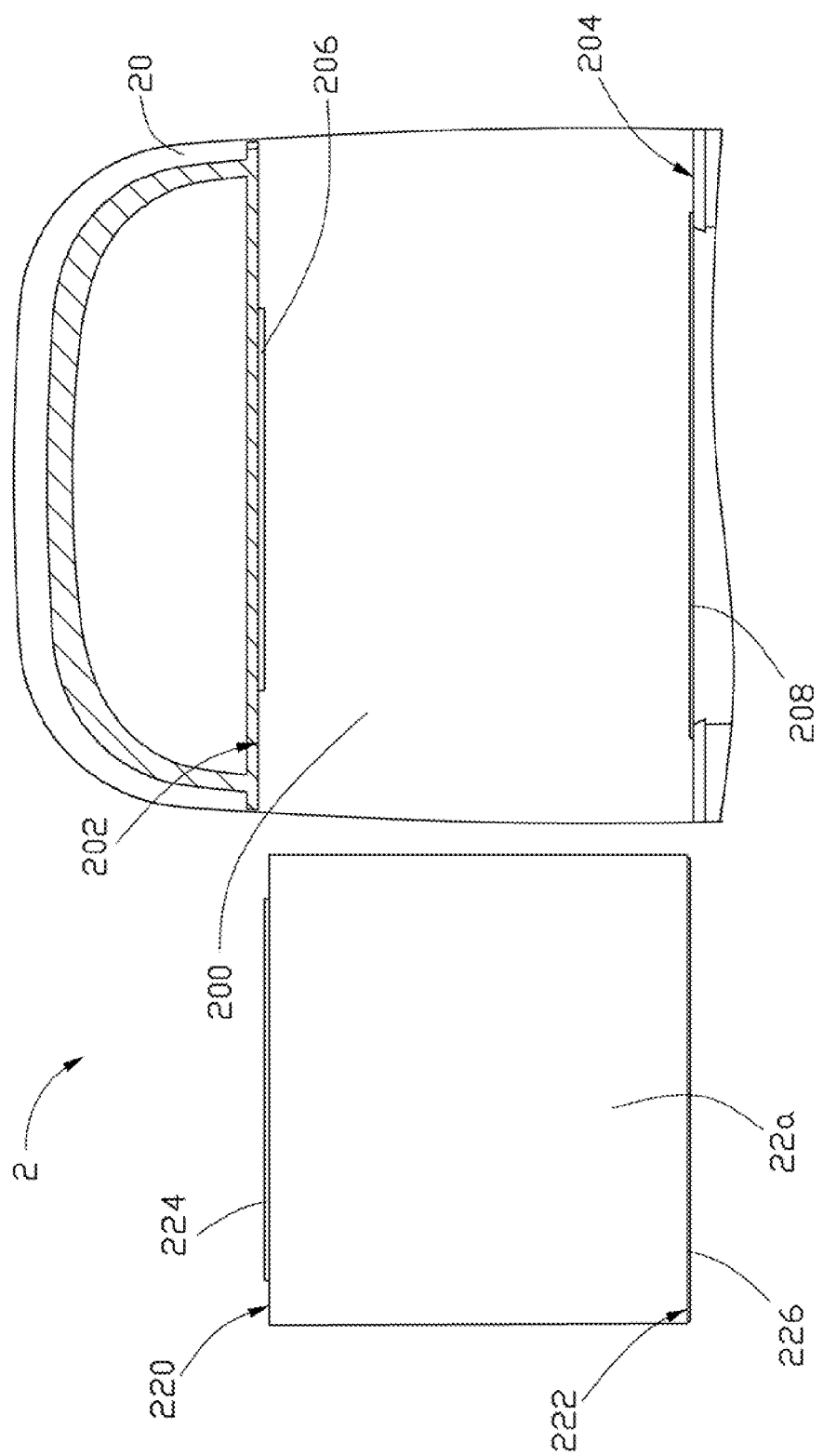
FIG. 1 is a schematic view of an electronic device, according to an exemplary embodiment.
Figure 2:
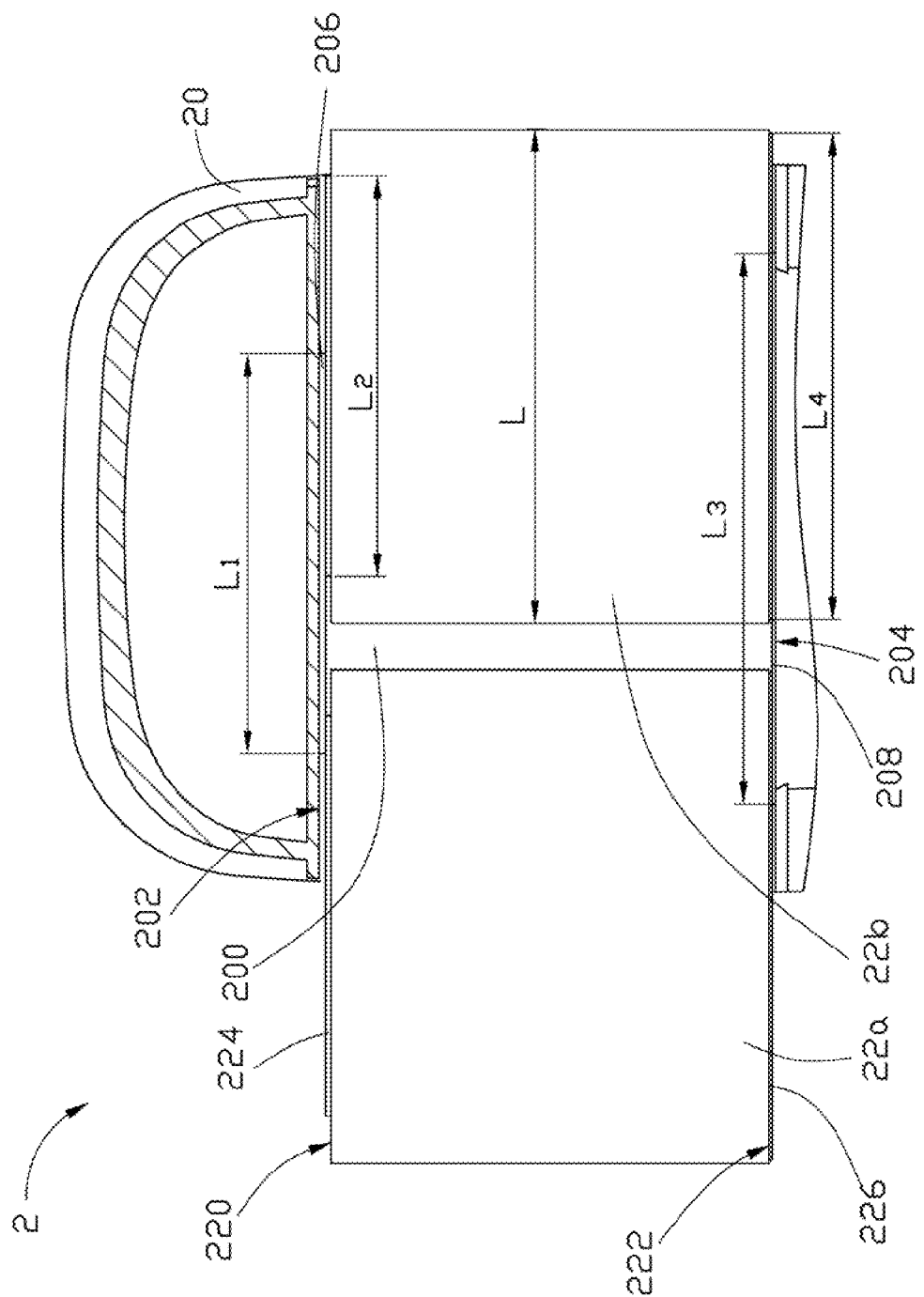
FIG. 2 is a schematic view of the electronic device of FIG. 1, which are in an operation state.

Referring to FIGS. 1-2, an electronic device 2 includes a main body 20, two rechargeable batteries 22a, 22b.

The main body 20 defines a sliding groove 200 passing through two parallel surfaces of the main body 20. The sliding groove 200 is cuboid in shape (a cross-section is shown in FIGS. 1-2) and includes an upper surface 202 and a lower surface 204 parallel to the upper surface 202. The electronic device 2 also includes a positive contact plate 206 (i.e., the positive electrode of the electronic device 2) and a negative contact plate 208 (i.e., the negative electrode of the electronic device 2). The positive contact plate 206 is positioned on the upper surface 202. The negative contact plate 208 is positioned on the lower surface 204. The positive contact plate 206 and the negative contact plate 208 are electrically connected to inner circuits of the electronic device 2 (not shown, i.e., a power driving circuit of the electronic device 2) correspondingly.

Each of the batteries 22a, 22b includes a top surface 220 and a bottom surface 222 parallel to the top surface 220. Each of the batteries 22a, 22b includes a positive power supply plate 224 (i.e., the positive electrode of the battery 22a/22b) and a negative power supply plate 226 (i.e., the negative electrode of the battery 22a/22b). The positive power supply plate 224 is positioned on the top surface 220. The negative power supply plate 226 is positioned on the bottom surface 222.

The length of the positive contact plate 206 is L1 and the length of the positive power supply plate 224 is L2. The length of the first rechargeable battery 22a or the second rechargeable batter 22b is L, where L1+L2>L. The length of the negative contact plate 208 is L3, and the length of the negative power supply plate 226 is L4, where L3+L4>L. As a result, as shown in FIG. 2, when a battery, e.g., the second battery 22b, runs out of power and is replaced with a new battery, e.g., the first battery 22a. The positive power supply plate 224 of the first battery 22a and the second battery 22b can both remain in contact with the positive contact plate 206 before the first battery 22a is completely replaced. The negative power supply plates 226 of the first battery 22a and the second battery 22b can also both remain in contact with the negative contact plate 208. That is, power remains supplied to the electronic device 2 while the first battery 22a is being replaced.

Figure 3:
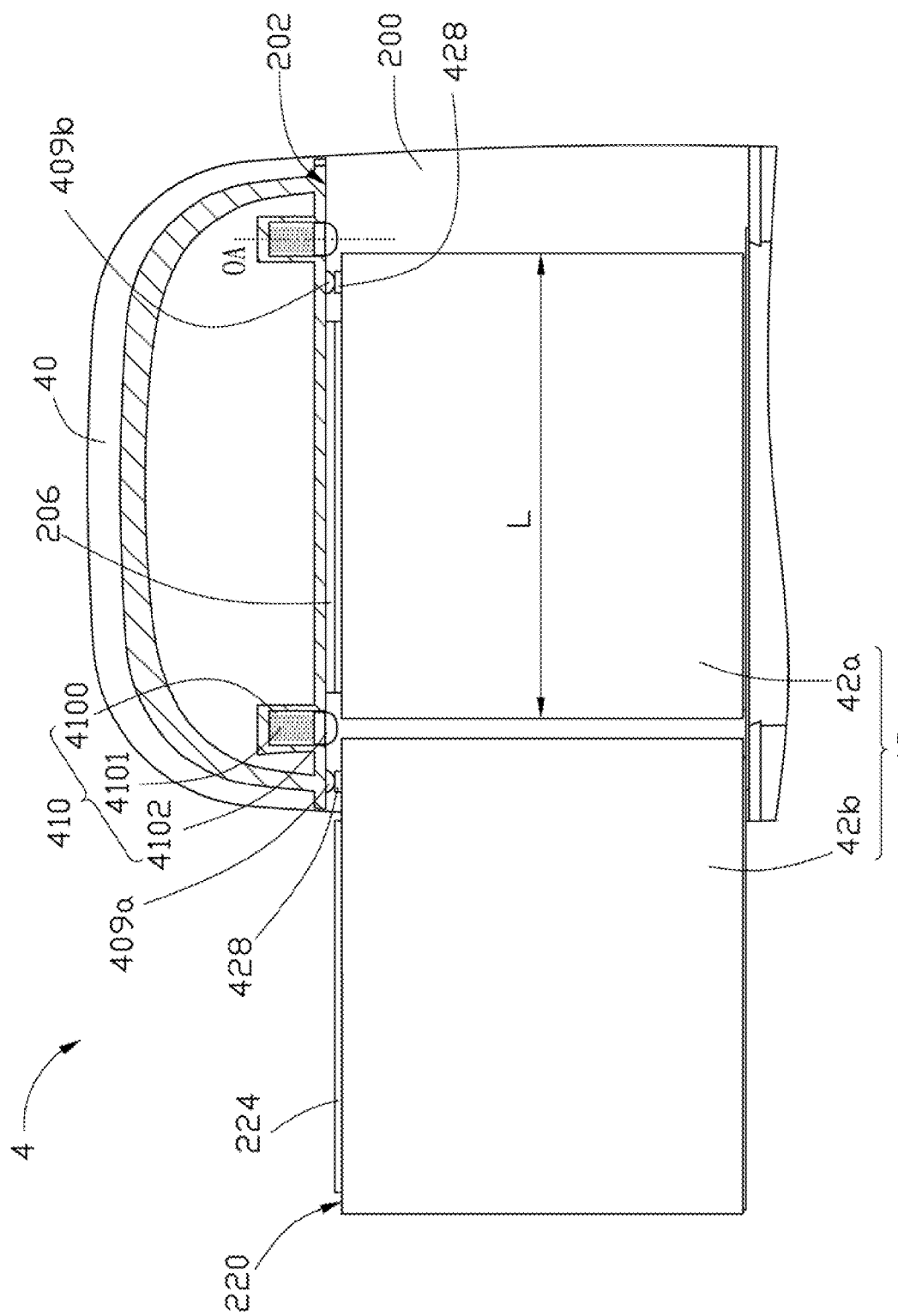
FIG. 3 is a schematic view of an electronic device, according to another exemplary embodiment.
Figure 4:
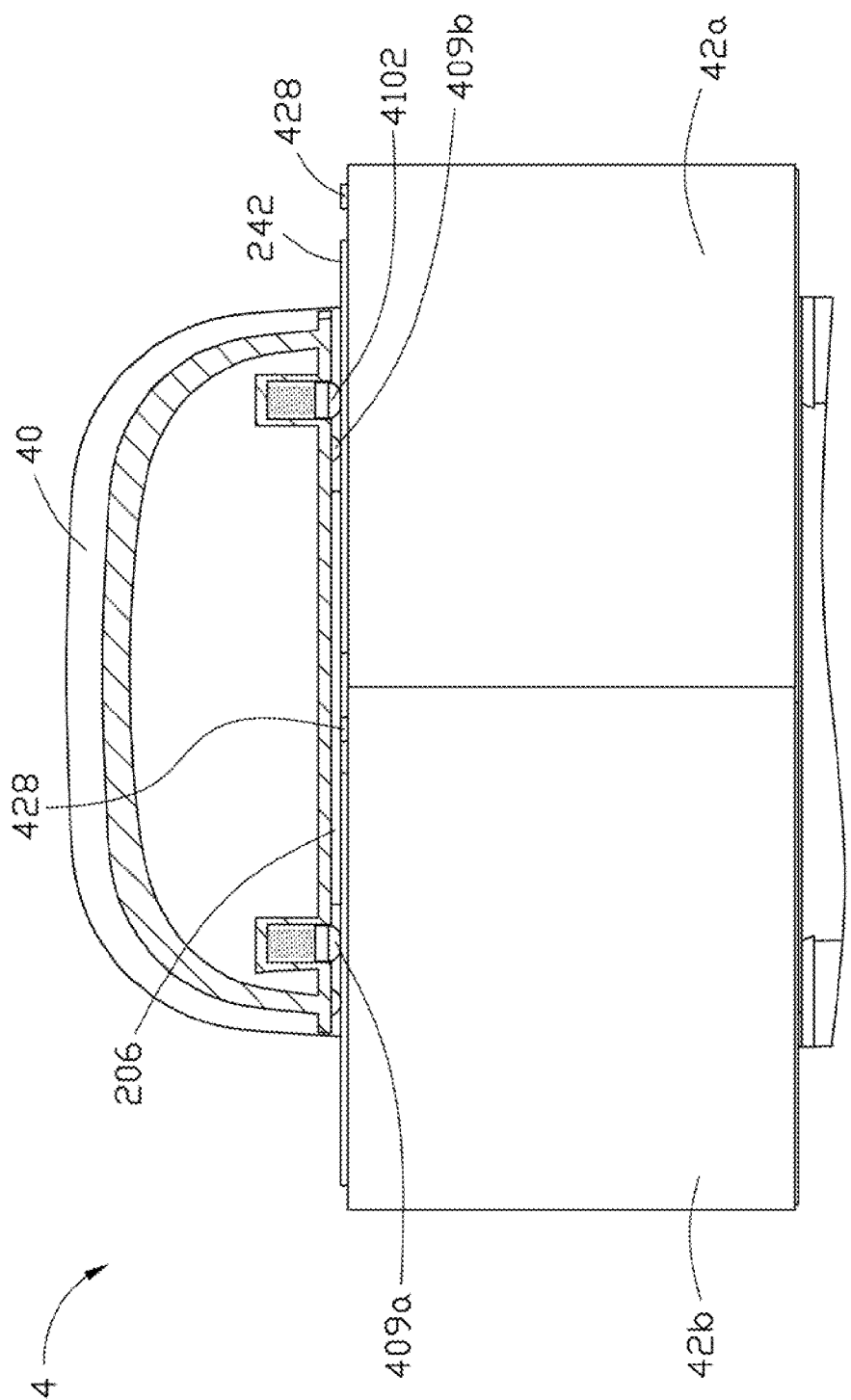
FIG. 4 is a schematic view of the electronic device of FIG. 3, which are in a first operation state.
Figure 5:
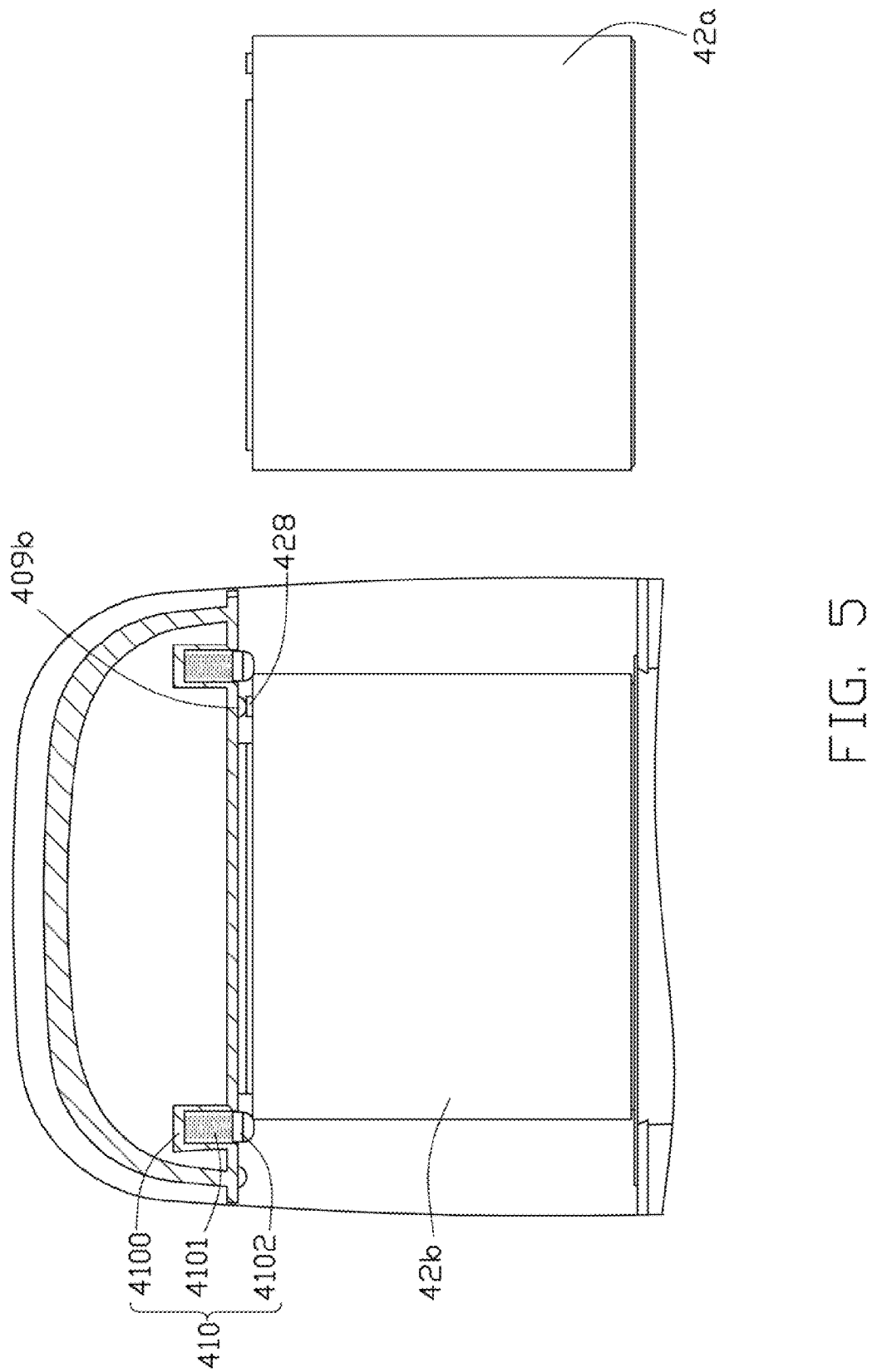
FIG. 5 is a schematic view of the electronic device of FIG. 3, which are in a second operation state.

Referring to FIGS. 3-5, an electronic device 4 in accordance with a second exemplary embodiment is disclosed. The electronic device 4 includes a main body 40 and two batteries 42a, 42b. The main body 40 is essentially similar to the main body 20 but further includes two locating structures 410. The batteries 42a, 42b is also essentially similar to the batteries 22a, 22b but each further includes a first detection pin 428. The two locating structures 410 are positioned on the upper surface 202, at two sides of the positive contact plate 206. In particular, the two locating structures 410 are substantially symmetrical with each other about the positive contact plate 206.

In particular, the first detecting pin 428 is adjacent to one edge of the positive power supply plate 224, and is coupled to inner circuits of the first battery 42a or the second battery 42b.

The electronic device 4 further includes a second detecting pin 409a and a third detecting pin 409b. The second detecting pin 409a and the third detecting pin 409b are positioned at two sides of the positive contact plate 206 and connected to the inner circuits of the electronic device 4. In particular, the second detecting pin 409a is positioned on either side of the sliding groove 200, outside a corresponding locating structure 410. The third detecting pin 409b is positioned on the other side of the sliding groove 200 and between the positive contact plate 206 and a corresponding locating structure 410. When the second detecting pin 409a and/or the third detecting pin 409b are/is electrically contacted with the first detecting pin 428, the inner circuits of the electronic device 4 can detect a state of the battery, e.g., the rechargeable battery 44a/44b, such as residual power, outputting voltage and so on.

Each of the locating structure 410 includes a countersink 4100, a elastic coil 4101, and a movable member 4102. The two countersinks 4100 communicate with the sliding groove 200. The distance between the two countersinks 4100 is slightly longer than the length L of the batteries 44a, 44b. One end of the elastic coil 4101 is connected to the bottom surface of a corresponding countersink 4100, and the other end is connected to the movable member 4102. The elastic coil 4101 is electrically coupled to the inner circuits. The central axis OA of the countersink 4100 is substantially perpendicular to the upper surface 202. The natural length of the elastic coil 4101 is slightly longer than the depth of the countersink 4100. The diameter of movable member 4102 is slightly smaller than the aperture of the countersinks 4100. As such, the movable member 4102 slightly protrudes outside the countersink 4100 and can be drawn back in the countersink 4100 by the elastic coil 4101.

When the first battery 42a or the second battery 42b is operational, the movable member 4102 slightly protrudes outside the countersink 4100 and limits the sliding range of the battery 42a/42b.

When the first battery 42a (or the second battery 42b, if being used) is about to run out of power, this is detected by the third detecting pin 409b, the elastic coil 4101 is signaled by the third detecting pin 409b via the inner circuits of the electronic device 4. For example, when the third detecting pin 409b detects the voltage of the second battery 42b is less than a certain voltage, e.g., 2 Volts, the electronic device 4 will alarms the users needing to replace dead battery (second battery 42b) with a new battery (first battery 42a), and the third detecting pin 409b will send a signal to the elastic coil 4101, thereby, the movable member 4102 is drawn back in the countersink 4100. The first battery 42a can slide in and out the sliding groove 200. Thus, replacement of the battery is achieved without interrupting power to the electronic device 4.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An electronic device, comprising:

two batteries, each of the batteries comprising a positive power supply plate, a negative power supply plate, a top surface and a bottom surface parallel to the top surface and a first detecting pin, the positive power supply plate and the first detecting pin positioned on the top surface, the negative power supply plate positioned on the bottom surface;

a main body defining a sliding groove passing through two parallel surfaces of the main body, the sliding groove comprising an upper surface and a lower surface parallel to the upper surface, the main body comprising a positive contact plate and a negative contact plate, the positive contact plate positioned on the upper surface, the negative contact plate positioned on the lower surface;

two locating structures positioned at two sides of the positive contact plate, the two locating structures configured for preventing one of the batteries from sliding out of the sliding groove; and a second detecting pin positioned on either side of the sliding groove, outside a corresponding locating structure, wherein when the second detecting pin is electrically contacted with the first detecting pin, inner circuits of the electronic device detect a state of the battery.

2. The electronic device as claimed in claim 1, wherein each of the locating structure comprising a countersink, an elastic coil, and a movable member, the countersink communicated with the sliding groove, one end of the elastic coil connected to the bottom surface of the countersink, and the other end connected to the movable member.

3. The electronic device as claimed in claim 2, further comprising a third detecting pin positioned on the other side of the sliding groove and between the positive contact plate and a corresponding locating structure, when the third detecting pin is electrically contacted with the first detecting pin, the inner circuits of the electronic device detect the state of the battery.

4. The electronic device as claimed in claim 3, wherein the elastic coil is signaled by the third detecting pin via the inner circuits of the electronic device, when the battery is about to run out of power being detected by the third detecting pin.

5. The electronic device as claimed in claim 4, wherein the sum of the length of the positive contact plate and the length of the positive power supply plate is larger than the length of the battery.

6. The electronic device as claimed in claim 4, wherein the sum of the length of the negative contact plate and the length of the negative power supply plate is larger than the length of the battery.

7. The electronic device as claimed in claim 4, wherein the diameter of the movable member is slightly smaller than the aperture of the countersinks 8. The electronic device as claimed in claim 4, wherein the natural length of the elastic coil is slightly longer than the depth of the countersink.

9. The electronic device as claimed in claim 4, wherein the first detecting pin is adjacent to one edge of the positive power supply plate.

* * * * *